May 9, 1967 L. E. ANNUS ETAL 3,319,112

LINEARITY CORRECTION CIRCUIT

Filed Feb. 10, 1964 2 Sheets-Sheet 1

INVENTORS
Leonhard E. Annus
& Leslie N. Thibodeau
By W. H. Spreagle
Attorney

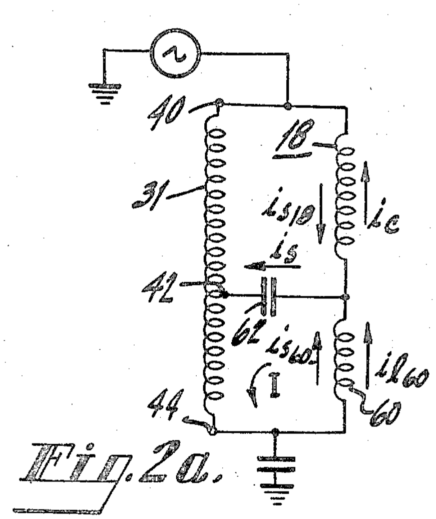
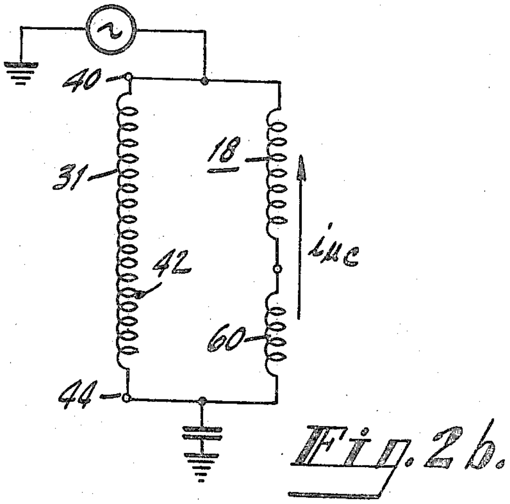
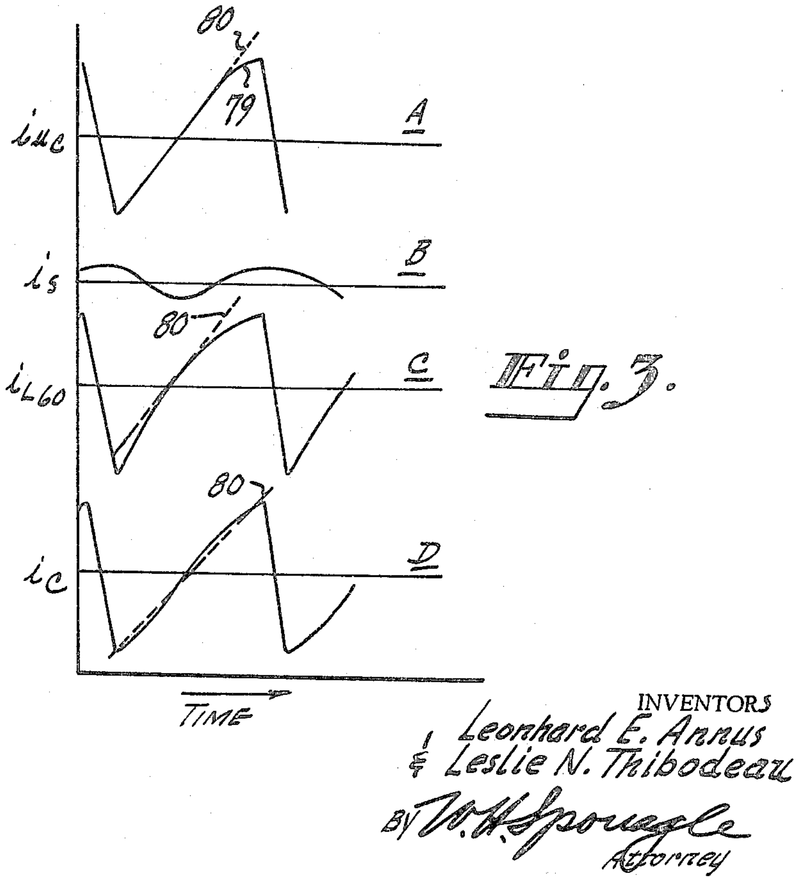
Fig. 3.
INVENTORS
Leonhard E. Annus
& Leslie N. Thibodeau
BY W. H. Sprouagle
Attorney 3,319,112
LINEARITY CORRECTION CIRCUIT
Leonhard Ervin Annus and Leslie Neil Thibodeau, Indianapolis, Ind., assignors to Radio Corporation of America, a corporation of Delaware
Filed Feb. 10, 1964, Ser. No. 343,539
5 Claims. (Cl. 315—27)

This invention relates to circuit arrangements for providing electromagnetic deflection of an electron beam in television apparatus. The invention is related more particularly to linearity correction circuits which improve the trace linearity of a deflected beam.

A requirement for linear scanning of an electron beam in a television apparatus is widely recognized. In a conventional electromagnetic scanning arrangement, current having a generally sawtooth waveform flows in a yoke winding and establishes a periodically varying electromagnetic field for deflecting the electron beam in a scanning raster. A trace segment of this waveform largely determines the linearity of scan. Manufacturing variations in the electrical characteristics of components in the deflection system such as the yoke winding, as well as cathode ray tube screen curvature, can render the resulting trace at the screen non-linear. Thus, it is customary to provide means for shaping the trace segment of the current waveform to compensate for these factors and thereby effect a linear deflection of the beam at the screen of the cathode ray tube.

Various types of L–C networks have been utilized for providing horizontal linearity correction in a television apparatus. In general, an L–C network is coupled in a secondary circuit of a deflection output transformer and is periodically excited at the horizontal scanning rate $f_h$. In one form, an excited L–C circuit which is resonant at the frequency $f_h$ generates a waveform which alters normal conduction of an efficiency diode in a power recovery circuit. Diode conduction is altered in a manner for substantially providing a desired modification in the current waveform being generated. Another form of L–C circuit incorporates the deflection winding inductance as an inductive element of a resonant L–C network. The L–C circuit has a resonant frequency well below the frequency of horizontal scan and a current flowing in the resonant circuit alters the deflection waveform.

Alteration of diode conduction to effect linearity correction has attending limitations. The amplitude of the trace segment of the sawtooth current waveform generally increases exponentially and causes asymmetrical non-linearity in beam trace. This non-linearity is characterized by compression of the raster near termination of trace. Alteration of diode conduction is generally ineffective in correcting the non-linear compression of the raster. Further, linearity adjustments in this current at times results in wide variations of current flow in the efficiency diode and driver amplifier. A misadjustment can result in excessive current in these elements and cause their operation beyond safe energy dissipation limits.

In order to provide linearity correction across the width of the raster and particularly near the termination of a trace segment, it has been found desirable to impart an S shape to the trace segment of the sawtooth current waveform. Incorporating the deflection winding inductance as a portion of an L–C network which is tuned to a frequency well below the scanning frequency does not provide the desired S shaping of the trace segment.

Accordingly, it is an object of the present invention to provide an improved linearity correction circuit for use with an electromagnetic beam deflection circuit.

Another object of this invention is to provide a linearity correction circuit for a television apparatus which is adapted to correct linearity over substantially the entire horizontal width of the raster being formed.

Another object of this invention is to provide a relatively simple and inexpensive linearity correction circuit which is adapted to provide S shaping of a trace segment of a sawtooth waveform.

A further object of this invention is to provide a relatively simple and inexpensive linearity correction circuit which is adapted to correct horizontal linearity for relatively wide angle cathode ray tubes.

Still another object of the invention is to provide an adjustable linearity correction circuit for use with the horizontal deflection system of a television apparatus which is adapted to adjust linearity, yet which has substantially little effect on the established dissipation level of an amplifying device or efficiency diode utilized in the deflection circuit arrangement when an adjustment is made.

In accordance with the present invention, an L–C linearity correction network is provided and coupled in parallel with a segment of a winding of a deflection output transformer in a television apparatus. The L–C network forms a circuit loop with the transformer winding segment, and components of the network are adapted to cause series resonance of the circuit loop at a frequency $f_r$, which is substantially equal to a horizontal scanning frequency $f_h$. An electron beam deflection winding for the apparatus is coupled between the L–C network and the transformer winding. Means are coupled to the transformer winding for periodically generating a current of generally sawtooth waveform in the deflection winding and for exciting the circuit loop at a frequency $f_h$. By this arrangement, a sinusoidal current circulates in the output circuit of the transformer and operates to cause S shaping of the trace segment of the deflection current.

These and other objects, features and the attending advantages of the invention will be apparent with reference to the following specification and drawings, in which:

FIGURE 2 is an equivalent circuit diagram of the transformer output circuit illustrating the various currents flowing therein; and FIGURE 3 is a diagram illustrating the various electrical current waveforms existing in the transformer output circuit.

Figure 1:
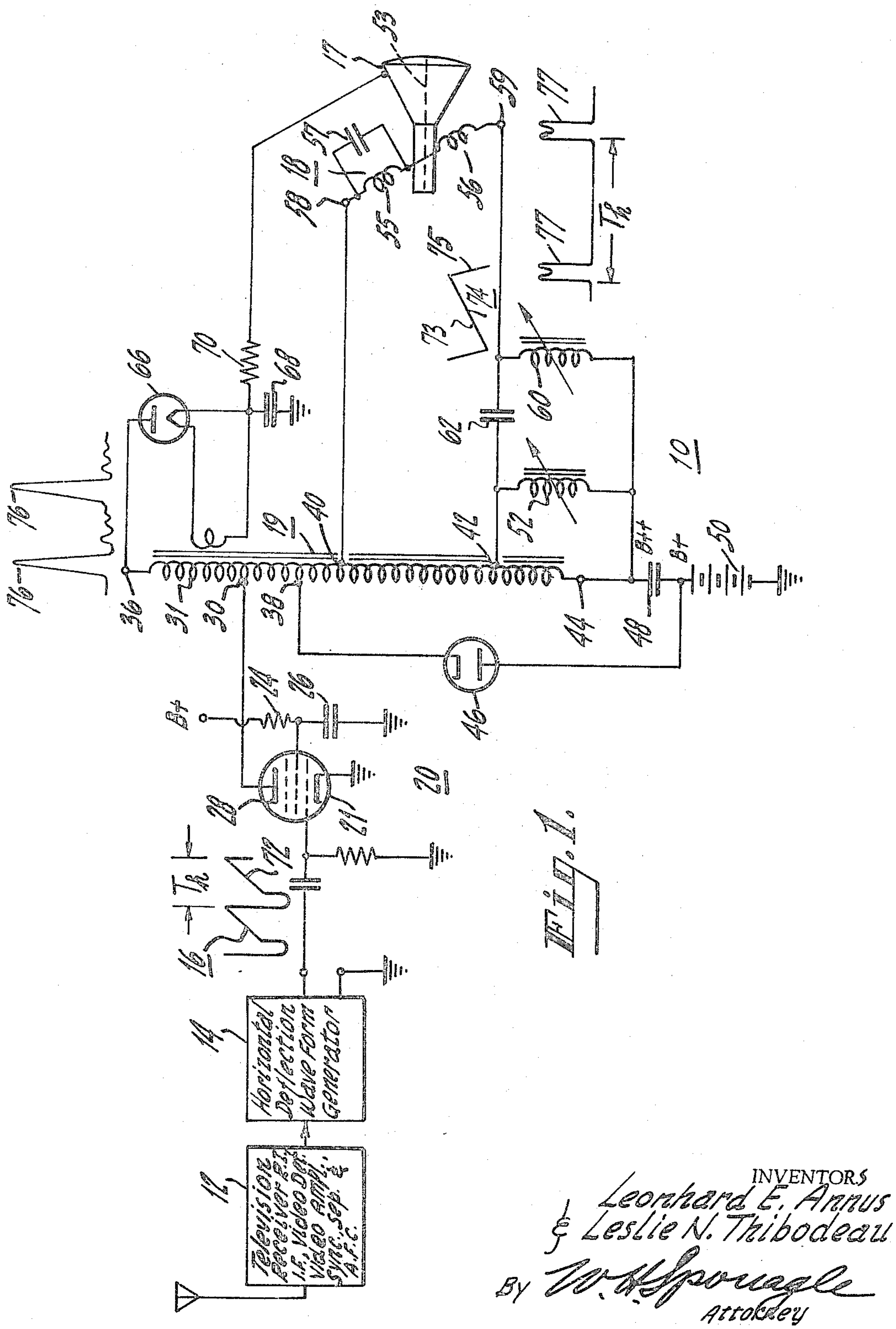
FIGURE 1 is a diagram, partly in block and partly in schematic form, illustrating an embodiment of the present invention.

Referring now to FIGURE 1, a horizontal deflection stage for a television apparatus is shown and is indicated generally as 10. The deflection stage is illustrated for use in a television receiver. Various other conventional stages of the television receiver which provide a driving signal for the deflection stage 10 are indicated as 12 and 14. The block 12 includes radio frequency, intermediate frequency amplifier, video detector, video amplifier, sync separator and automatic frequency control stages. These stages are conventional and further detailed description is not believed necessary. The block 14 represents a conventional deflection waveform generator, such as a multivibrator or blocking oscillator. A direct-current control voltage is coupled from the automatic frequency control stage of 12 to the waveform generator 14 for controlling the frequency of operation. A deflection waveform 16 is provided at an output terminal of the waveform generator 14 and is R–C coupled to a driver amplifier in the deflection stage 10.

The deflection stage is adapted to generate an electromagnetic field for deflecting an electron beam in a cathode ray tube 17. The deflection stage 10 includes, generally, a horizontal deflection winding 18, a horizontal output transformer 19, and a driver amplifier. The driver amplifier periodically excites the transformer and causes a sawtooth current to flow in the winding 18.

In greater detail now, the driver amplifier is conventional and comprises a pentode electron discharge device 21. An anode electrode 28 of the amplifying device 21 is coupled to a terminal 30 of a winding 31 of the horizontal output transformer 19. For the purposes of this specification and the accompanying claims, the expression "terminal" when utilized with respect to the transformer 19 refers to means for providing a galvanic connection to the winding 31. The transformer includes a high voltage output terminal 36, an efficiency diode terminal 38, a secondary circuit output terminal 40, an intermediate terminal 42, and a secondary output terminal 44. A conventional power recovery circuit is provided and includes an efficiency diode 46 and a B+ boost capacitor 48. Direct current operating potential is coupled from a source 50 to a junction of an anode electrode of the efficiency diode 46 and boost capacitor 48. In a known manner, a boost voltage B++ is provided at the capacitor 48 during operation of the circuit. This voltage constitutes an anode operating potential for the pentode 21 and is applied thereto via a portion of the winding 31. A conventional adjustable width control inductor 52 is coupled between transformer terminals 42 and 44 for adjusting the amplitude of horizontal deflection.

The horizontal deflection winding 18 comprises a pair of windings 55 and 56 which are symmetrically disposed about the neck of a cathode ray tube 17. A capacitor 57 shunts the winding section 55 for tuning the deflection winding for minimum ringing. When a sawtooth current flows in the winding, an electromagnetic field is established at the cathode ray tube 17 for horizontally deflecting an electron beam, indicated by the dashed line 53, across a face of the picture tube 17. The winding 18 is coupled to the transformer 19 for establishing this sawtooth current in the deflection winding. A first terminal 58 of the winding 18 is coupled to the transformer secondary terminal 40 while a second terminal 59 is coupled to an L–C linearity correction network. An L–C network comprising a serially coupled inductor 60 and a capacitor 62 is coupled in parallel with a segment of the transformer winding extending between terminals 42 and 44. The expression "terminal" when referring to the deflection winding 18 refers to means providing a galvanic connection to the winding 18.

A conventional high voltage rectifier 66 is coupled to a tertiary winding of the transformer which comprises those turns extending between terminals 30 and 36. The rectifier provides a direct-current accelerating potential which is filtered by an R–C combination comprising capacitor 68 and resistor 70.

In operation, the voltage waveform 16 recurs periodically at a frequency $f_h$ which, in a conventional television receiver, is 15.750 kilocycles per second. This waveform drives the pentode 21 into conduction during a latter portion of a trace segment 72 of the waveform 16. Driver tube current conduction contributes to the formation of a latter portion of a trace segment 73 of a sawtooth current waveform 74 flowing between terminals 58 and 59 of the winding 18. At the termination of the trace segment 72 of voltage waveform 16, the pentode 21 is cut-off and a retrace segment 75 of the sawtooth current waveform is thereby generated. During retrace, various transient voltages exist in the output circuit of the transformer 19 including a flyback pulse 76 at a tertiary winding for establishing a high beam accelerating voltage. In addition, a voltage is developed across the winding of the transformer which causes current to flow in a reverse direction through the deflection winding 18 and in the diode 46. As is well known, this current contributes to the formation of the sawtooth current flowing in the winding 18 during the initial or early portions of the trace segment 73 of the sawtooth current waveform 74. In addition, a pulse voltage 77 is developed between terminals 42 and 44 during retrace. As is indicated hereinafter, the energy of this pulse excites the aforementioned L–C network.

The inductor 60 and capacitor 62 form a circuit loop with the segment of the transformer winding extending between terminals 42 and 44. The circuit loop is adapted to be series resonant at a frequency $f_r$ which is substantially equal to the horizontal deflection frequency $f_h$. The pulse 77 occurring between terminals 42 and 44 excites this resonant circuit and causes the circuit to oscillate. A sinusoidal current flows in this circuit loop and thereby provides a means for altering the form of the deflection with trace segment.

For a detailed explanation of the manner in which the sinusoidal current modifies the trace segment, reference is now made to FIGURES 2 and 3. FIGURE 2A is an equivalent A.C. circuit of a part of the deflection output circuit, while FIGURE 2B is an equivalent A.C. circuit of the deflection output circuit, but which does not include the capacitor 62 of the correction network for purposes of the explanation. In the arrangement of FIGURE 2B, it can be seen that the linearity inductor 60 is in series with the deflection winding 18 and thus comprises an inductive load in addition to the yoke winding 18. An uncorrected sawtooth current, $i_{uc}$, flows serially in these windings. A trace segment of this current has an exponential rise in amplitude as indicated in FIGURE 3A, and a non-linear segment 79 near the termination of the trace segment causes compression of the raster near an edge. Non-linearity is illustrated by comparison of a linear dotted line 80 with the curves A, C and D of FIGURE 3. As indicated previously, it is desirable to reduce this compression.

In FIGURE 2A the capacitor 62 provides a closed circuit loop I with the inductor 60 and the segment of the transformer windings between terminals 42 and 44, and a sinusoidal current is caused to flow in the loop as the loop is periodically excited by the pulse 77. A sinusoidal current $i_s$ flows in the capacitor 62. This current is illustrated in FIGURE 3B. Part of this sinusoidal current, $i_{s60}$, flows in the inductor 60. Another part of this sinusoidal current, $i_{s18}$, flows in the deflection winding 18. These sinusoidal components add to provide the current $i_s$ and combine with the uncorrected sawtooth current, $i_{uc}$, of FIGURE 3A to provide resultant sawtooth currents $i_{160}$ and $i_c$ in the inductor 60 and deflection winding 18 respectively. The waveform of the current $i_{160}$ is illustrated in FIGURE 3C. It can be seen that the non-linearity of this current is increased substantially over the uncorrected current of FIGURE 3A. Whereas the current $i_{s160}$ combines with the current $i_{uc}$ according to the relation $i_{160}=i_{uc}-i_{s60}$, the current $i_{s18}$ combines with the current $i_{uc}$ according to the relation $i_c=i_{uc}-i_{s18}$. That is, the currents $i_{s18}$ and $i_{s60}$ are phase opposed with respect to $i_{cu}$. FIGURE 3D illustrates the resultant S-shaping of the trace segment of deflection current $i_c$.

In order to provide the desired S-shaping, the frequency $f_r$ of the current $i_{s18}$ should be substantially equal to the deflection frequency $f_h$. The frequency of the current $i_{s18}$ may be regulated by regulating the resonant frequency of the circuit loop I. The amount of S shaping necessary to effect desired linearity correction may be provided by suitably adjusting the phase and amplitude of $i_{s18}$ with respect to $i_{uc}$. These parameters may be varied by varying the resonant frequency of the loop I.

Thus, a relatively simple arrangement has been described for improving deflection linearity, yet which operates independently of the power recovery circuit and has little affect on the electrical characteristics of the yoke winding. The circuit arrangement when utilized with wide deflection angle cathode ray tubes is capable of providing non-linearity in the range of 5 to 8%.

While it will be understood that the value of circuit components for the linearity correction circuit of this invention can vary in order to fit individual requirements, the following circuit parameters have been found to provide satisfactory operation in an arrangement for providing horizontal deflection with a cathode ray tube having a 92° deflection angle and are included herein only by way of example as follows:

Cathode ray tube—23BKP4
Amplifying device 21—type 6GW6 electron discharge device
Efficiency diode 46—type 6AY3 electron discharge device
High voltage rectifier 63—type 3A3 electron discharge device
Transformer 19—type RCA 906127-501 or equivalent
  Turns measured from terminal 44:
    To terminal 42—88
    To terminal 40—616
    To terminal 38—704
    To terminal 30—1030
    To terminal 36—2780
Deflection winding 54—18.5 mh.
Inductor 60—adjustable 2–10 mh.
Capacitor 62—.04 $\mu$f.
Capacitor 48—.039 $\mu$f.
Capacitor 57—68 $\mu\mu$f.
B+ supply—271$^{v.}$ D.C.
Deflection frequency $f_h$—15.750 kilocycles per second While there is illustrated, described and pointed out in the annexed claims certain novel features of the invention, it will be understood that various omissions, substitutions, and changes in the forms and details of the system illustrated may be made by those skilled in the art without departing from the spirit of the invention and the scope of the claims.

What is claimed is:

1. An electromagnetic deflection circuit arrangement comprising:
a deflection output transformer having a winding formed of a plurality of turns;
linearity correction means having a capacitive and an inductive element series coupled to and forming a circuit loop with a segment of said winding for providing;
series resonance of said loop at a frequency $f_r$;
an electron beam deflection winding coupled between said transformer winding and said correction network; and
circuit means coupled to said transformer winding and adapted for causing a periodic sawtooth current of frequency $f_h$ to flow in said deflection winding and a periodic current to flow in said resonant circuit loop;
said resonant frequency $f_r$ having a value substantially equal to the frequency $f_h$.

2. An electromagnetic deflection circuit arrangement comprising:
a deflection output transformer having a winding formed of a plurality of turns;
linearity correction means including a capacitor and an inductor serially coupled across a segment of said transformer winding and forming a circuit loop with the segment for providing
series resonance of said loop at a frequency $f_r$;
an electron beam deflection winding positioned relative to a cathode ray tube and adapted to deflect an electron beam of the tube when a sawtooth current is caused to flow in the deflection winding;
means coupling said deflection winding between said correction network and said transformer winding; and
means coupled to said transformer winding and adapted for exciting said transformer at a frequency $f_h$ and causing a sawtooth current to flow in said deflection winding and a current to flow in said linearity correction network;

said resonant frequency $f_r$ having a value substantially equal to the frequency $f_h$.

3. An electromagnetic deflection circuit arrangement comprising:
a deflection output transformer having a winding formed of a plurality of turns and a plurality of terminals disposed along the length of the winding;
a deflection winding, positioned relative to a cathode ray tube and adapted to deflect an electron beam of said tube when a sawtooth current flows in said winding;
said deflection winding having first and second terminals;
linearity correction means including a capacitor and an inductor serially connected between first and second transformer winding terminals for forming a series resonant circuit loop with a segment of the transformer winding extending between said first and second terminals;
said circuit loop having a loop resonant frequency $f_r$;
means connecting said first deflection winding terminal to said inductor and said second deflection winding terminal to a third transformer terminal; and
means coupled to said transformer winding and adapted for electrically exciting said winding at a frequency $f_h$ and causing a sawtooth current to flow in said deflection winding and a current to flow in said resonant circuit loop;
said resonant frequency $f_r$ having a value substantially equal to the frequency $f_h$.

4. An electromagnetic deflection circuit arrangement comprising:
a deflection output transformer having a winding formed of a plurality of turns;
said winding having first, second, and third terminals;
said second terminal positioned along the length of said winding at a point electrically intermediate said first and third terminals;
linearity correction means including a capacitor and inductor serially connected between said first and second terminals and having a junction point at a connection of said capacitor and inductor for forming a series resonant circuit loop with a segment of the transformer extending between said first and second terminals;
said circuit loop having a series resonant frequency $f_r$;
an electron beam deflection winding positioned relative to a cathode ray tube and adapted to deflect an electron beam of the tube when a sawtooth current flows in said winding;
said deflection winding having first and second terminals;
means connecting the first terminal of said deflection winding to the junction point of said capacitor and inductor and said second deflection winding terminal to said third transformer output terminal; and
means coupled to said transformer winding and adapted for electrically exciting said winding at a frequency $f_h$ for causing a sawtooth current to flow in the deflection winding and a current to flow in the resonant circuit loop;
said resonant frequency $f_r$ having a value substantially equal to the frequency $f_h$.

5. An electromagnetic deflection circuit arrangement comprising:
a deflection output transformer having a winding formed of a plurality of turns;
said winding having first, second, and third terminals;
said second terminal positioned along the length of said winding at a point electrically intermediate said first and third terminals;
series resonant linearity correction means including a capacitor and inductor serially connected between said first and second terminals and having a junction point at a connection of said capacitor and inductor;

said inductor connected to said first terminal and said capacitor connected to said second terminal for forming a series resonant circuit loop with a segment of the transformer extending between said first and second terminals;

said circuit loop having a series resonant frequency $f_r$;

an electron beam deflection winding positioned relative to a cathode ray tube and adapted to deflect an electron beam of the tube when a sawtooth current flows in said winding;

said deflection winding having first and second terminals;

means connecting the first terminal of said deflection winding to the junction point of said capacitor and inductor and said second deflection winding terminal to said third transformer output terminals; and means coupled to said transformer winding and adapted for electrically exciting said winding at a frequency $f_h$ for causing a sawtooth current to flow in the deflection winding and a current to flow in the resonant circuit loop;

said resonant frequency $f_r$ having a value substantially equal to the frequency $f_h$.

References Cited by the Examiner

UNITED STATES PATENTS

| | | | |
|---|---|---|---|
| 2,871,405 | 1/1959 | Vonderschmitt | 315—27 |
| 2,905,856 | 9/1959 | Schlesinger | 315—27 |

JOHN W. CALDWELL, *Acting Primary Examiner.*

T. A. GALLAGHER, *Assistant Examiner.*